Patented Aug. 7, 1928.

1,679,966

UNITED STATES PATENT OFFICE.

EDWARD S. FARROW, JR., OF ROCHESTER, NEW YORK, ASSIGNOR TO EASTMAN KODAK COMPANY, OF ROCHESTER, NEW YORK, A CORPORATION OF NEW YORK.

PROCESS OF MAKING CELLULOSE ACETATE.

No Drawing.   Application filed September 5, 1925. Serial No. 54,816.

This invention relates to processes for making cellulose acetate. One object of the invention is to provide such a process in which a relatively simple and inexpensive preliminary treatment of the cellulosic material will greatly facilitate the acetylating reaction and result in an improved reaction mixture. Another object is to provide a process by means of which cellulose acetate relatively free from grain may be obtained from various kinds of cellulosic materials, including those which have heretofore been considered inferior, such as wood pulp. Other objects will hereinafter appear.

I have found that cellulosic materials such, for example, as cotton, cotton linters, rag stock, wood pulp, etc., may be so altered by treatment with strong aqueous solutions of hydrochloric acid that they can be more readily acetylated and will form reaction dopes or mixtures substantially free from insoluble particles or grain.

My preliminary treatment of the cellulosic raw material is carried out with concentrated solutions of hydrochloric acid in water. In general a useful range of concentration is from 25% up to the saturation point at room temperature and pressure. Commercial acid having a concentration between 30 and 35% is preferred. The treatment is preferably carried on at room temperature, although a slight degree of heat is permissible. Because of the precautions which must be taken to prevent serious degradation of the cellulose, when heat is employed, I prefer to use temperatures in the neighborhood of 21° C.. The time of treatment may vary considerably, from two to six hours covering the most useful range. In any case the action is stopped before the physical appearance of the cellulosic material is materially changed and before the fibers have materially disintegrated.

I shall now give an example of my invention; but it will be understood that the latter is not restricted to the details of this illustration, except as indicated in the appended claims. A bath is prepared consisting of a 32% aqueous solution of hydrochloric acid. Cotton linters are immersed in this bath, preferably after being purified from grease or other deleterious substances in the usual manner. They are examined from time to time by taking samples, and the action is completed in about five or six hours. Care is taken to remove the acid before the cellulose fibers are appreciably disintegrated. It will be noted that the bath consisting of hydrochloric acid does not have strong oxidizing bodies in it.

When the preliminary treatment has been completed, the acid is drained or pressed from the fibers, and the latter washed in water and finally freed from moisture by any usual drying process. The drying operation is carried to the point where it is most economical from the standpoint of acetic anhydride. This expensive ingredient is converted by water into acetic acid, and therefore, the water in the treated cellulose is reduced to the lowest practical manufacturing proportions prior to treatment by the acetylating mixture. The latter may be any of the usual ones, one typical example being that which is disclosed in reissue Patent No. 12,637, Miles, Apr. 23, 1907, cellulose derivative and process of making the same.

In the above example, the cotton linters may be replaced by other cellulosic raw materials such as cotton, rag stock, shirt cuttings, shoe cuttings, sulfite wood pulp, soda wood pulp, etc.

Having thus described my invention, what I claim as new and desire to secure by Letters Patent is:

1. The process of making cellulose acetate, which comprises treating cellulosic material with an aqueous solution of hydrochloric acid having a concentration greater than 25% and free from oxidizing agents at room temperature for two to six hours, the action being stopped before the physical appearance of said material is appreciably changed, and thereafter acetylating the treated materials.

2. The process of making cellulose acetate, which comprises subjecting fibrous cellulose with an aqueous solution of hydrochloric acid having the strength of 30 to 35% at room temperature, the action being stopped before the fibers are materially disintegrated, and thereafter acetylating the treated fibers.

Signed at Rochester, New York this 25th day of August, 1925.

EDWARD S. FARROW, Jr.